US00RE42159E

(19) United States
(12) Reissued Patent
Townsend et al.

(10) Patent Number: US RE42,159 E
(45) Date of Reissued Patent: Feb. 22, 2011

(54) CIRCUIT FOR COMPENSATION FOR TIME VARIATION OF TEMPERATURE IN AN INDUCTIVE SENSOR

(75) Inventors: Christopher P. Townsend, Shelburne, VT (US); Steven W. Arms, Williston, VT (US)

(73) Assignee: Microstrain, Inc., Williston, VT (US)

(21) Appl. No.: 11/320,559

(22) Filed: Dec. 28, 2005

Related U.S. Patent Documents

Reissue of:
(64) Patent No.: 6,828,779
Issued: Dec. 7, 2004
Appl. No.: 09/911,959
Filed: Jul. 24, 2001

U.S. Applications:
(60) Provisional application No. 60/220,364, filed on Jul. 24, 2000.

(51) Int. Cl.
*G01B 7/14* (2006.01)

(52) U.S. Cl. ..... 324/207.12; 324/207.24; 324/225

(58) Field of Classification Search ..... 324/207.12, 324/217.15–207.16, 207.19, 207.24, 225, 324/234, 236, 239, 669–670
See application file for complete search history.

(56) References Cited

U.S. PATENT DOCUMENTS

| | | | |
|---|---|---|---|
| 4,954,776 | A | 9/1990 | Husher |
| 4,956,606 | A | 9/1990 | Kwiatkowski et al. |
| 5,015,948 | A | 5/1991 | Tew |
| 5,115,193 | A | 5/1992 | Bean et al. |
| 5,180,978 | A | 1/1993 | Postma et al. |
| 5,332,966 | A | 7/1994 | Berberich |
| 5,332,996 | A | 7/1994 | Guzinski et al. |
| 5,351,003 | A | 9/1994 | Bauer et al. |
| 5,381,090 | A | 1/1995 | Adler et al. |
| 5,521,496 | A | 5/1996 | Swadling |
| 5,914,593 | A | 6/1999 | Arms et al. |

*Primary Examiner*—Bot L LeDynh
(74) *Attorney, Agent, or Firm*—James Marc Leas

(57) ABSTRACT

A sensing device includes a circuit that compensates for time and spatial changes in temperature. The circuit includes elements to correct for variation in permeability of a highly permeable core of a differential variable reluctance transducer as temperature changes. The circuit also provides correction for temperature gradients across coils of the transducer.

73 Claims, 6 Drawing Sheets

CIRCUIT FOR COMPENSATION FOR TIME VARIATION OF TEMPERATURE IN AN INDUCTIVE SENSOR

Matter enclosed in heavy brackets [ ] appears in the original patent but forms no part of this reissue specification; matter printed in italics indicates the additions made by reissue.

RELATED APPLICATION

This application is a continuation-in-part of Provisional U.S. Patent Application 60/220,364, filed Jul. 24, 2000.

FIELD OF THE INVENTION

This invention generally relates to sensors. More particularly, it relates to variable reluctance transducers. Even more particularly, it relates to an improved system for greater accuracy in determining position or displacement in view of changes in temperature.

BACKGROUND OF THE INVENTION

Sensors are being developed for use in roads, bridges, dams, buildings, towers, and vehicles that may provide many information, including displacement, strain, speed, acceleration, temperature, pressure, and force.

Temperature changes can effect components within a sensor, and one challenge has been that sensor output has varied with temperature of sensor components. The effect of temperature on inductive transducers limits their overall absolute accuracy. To reduce the temperature effect, inductive transducers, such as a differential variable reluctance transformer (DVRT), have been designed with a differential pair of coils. A DVRT includes a ferrite core that moves within two coils that are arranged in a bridge configuration. Inductance and impedance of the coils changes with displacement of the ferrite core within them, and the displacement of the core is accurately determined by the change in inductance or impedance of the coils. Since the output signal of a differential pair is the difference between the output of two coils, temperature changes that both coils experience equally are theoretically subtracted out. However, if one coil experiences a different temperature environment than the other coil, a signal proportional to the temperature gradient between the two coils will appear at the circuit output, significantly reducing absolute accuracy.

Commonly assigned U.S. Pat. No. 5,914,593 ("the '593 patent"), incorporated herein by reference, provides a circuit for a DVRT that compensates for a temperature gradient across a sensor. The '593 patent recognizes that a temperature gradient across the coils can provide a change in the resistance of the wire forming one of the coils more than it changes the resistance in the other coil, and this difference in resistance can change the differential impedance of the coils, essentially mimicking a change in position, resulting in an error in measured displacement. Situations where one coil may be hotter than the other coil are common in applications such as automotive. In the '593 patent a circuit is provided to adjust the output compensating for the difference in resistance in the two coils introduced by a temperature gradient or a temperature difference between the coils.

However, the present inventors found that not all temperature effects were compensated by the circuit of the '593 patent. Thus, a better system for acquiring data is needed that provides improved temperature compensation, and this solution is provided by the following invention.

SUMMARY OF THE INVENTION

It is therefore an object of the present invention to provide a circuit that improves compensation for temperature changes in a sensor;

It is a further object of the present invention to provide a circuit that corrects for uniform temperature change over time and for spacial gradients in temperature;

It is a feature of the present invention to provide an ac signal and a dc signal to a differential sensor in a Wheatstone bridge configuration and to correct for time and spacial temperature differences based on the ac and dc output signals;

It is a feature of the present invention to provide a time varying temperature compensating circuit in combination with a temperature gradient compensating circuit;

It is an advantage of the present invention that more accurate data can be collected from a DVRT that is independent of variations in temperature either in time or space.

These and other objects, features, and advantages of the invention are accomplished by an electronic device that includes a sensor having a magnetically permeable member and a circuit. The circuit adjusts sensor output to provide sensor output data independent of temperature of the magnetically permeable member. The circuit uses a signal derived from resistance of the sensor to correct for temperature.

Another aspect of the invention is accomplished by an electronic device that includes a coil, a magnetically permeable member that extends in the coil, and a circuit. The circuit adjusts output voltage of the coil to compensate for a change in temperature in the coil and in the member.

Another aspect of the invention is accomplished by an electronic device that includes an inductor, a magnetically permeable member coupled to the inductor, and a circuit. The circuit adjusts a voltage output of the inductor to provide a voltage independent of temperature of the inductor and temperature of the magnetically permeable member.

Another aspect of the invention is accomplished by an electronic device for sensing at least one parameter that includes a first circuit element comprising a reactance and a resistance, the first circuit element comprising input terminals and output terminals. The input terminals are for providing a first input signal and a second input signal different from the first signal to the first circuit element. The output terminals are for providing a first output signal and a second output signal from the first circuit element. A second circuit element is connected to the output terminals to use the first output signal and the second output signal, wherein the second circuit element generates a first parameter that depends exclusively on the resistance and a second parameter that depends exclusively on the reactance. A third circuit element is connected to the second circuit element wherein the third circuit element compensates the second parameter for changes in the first parameter.

Another aspect of the invention is accomplished by a sensor comprising a component and a circuit. The component is used by the circuit both for sensing a first parameter and for sensing temperature. The temperature is used in the circuit for correcting the first parameter to make output of the sensor independent of change in temperature with lime.

BRIEF DESCRIPTION OF THE DRAWINGS

The foregoing and other objects, features, and advantages of the invention will be apparent from the following detailed description of the invention, as illustrated in the accompanying drawings, in which.

DETAILED DESCRIPTION OF THE INVENTION

Figure 1:
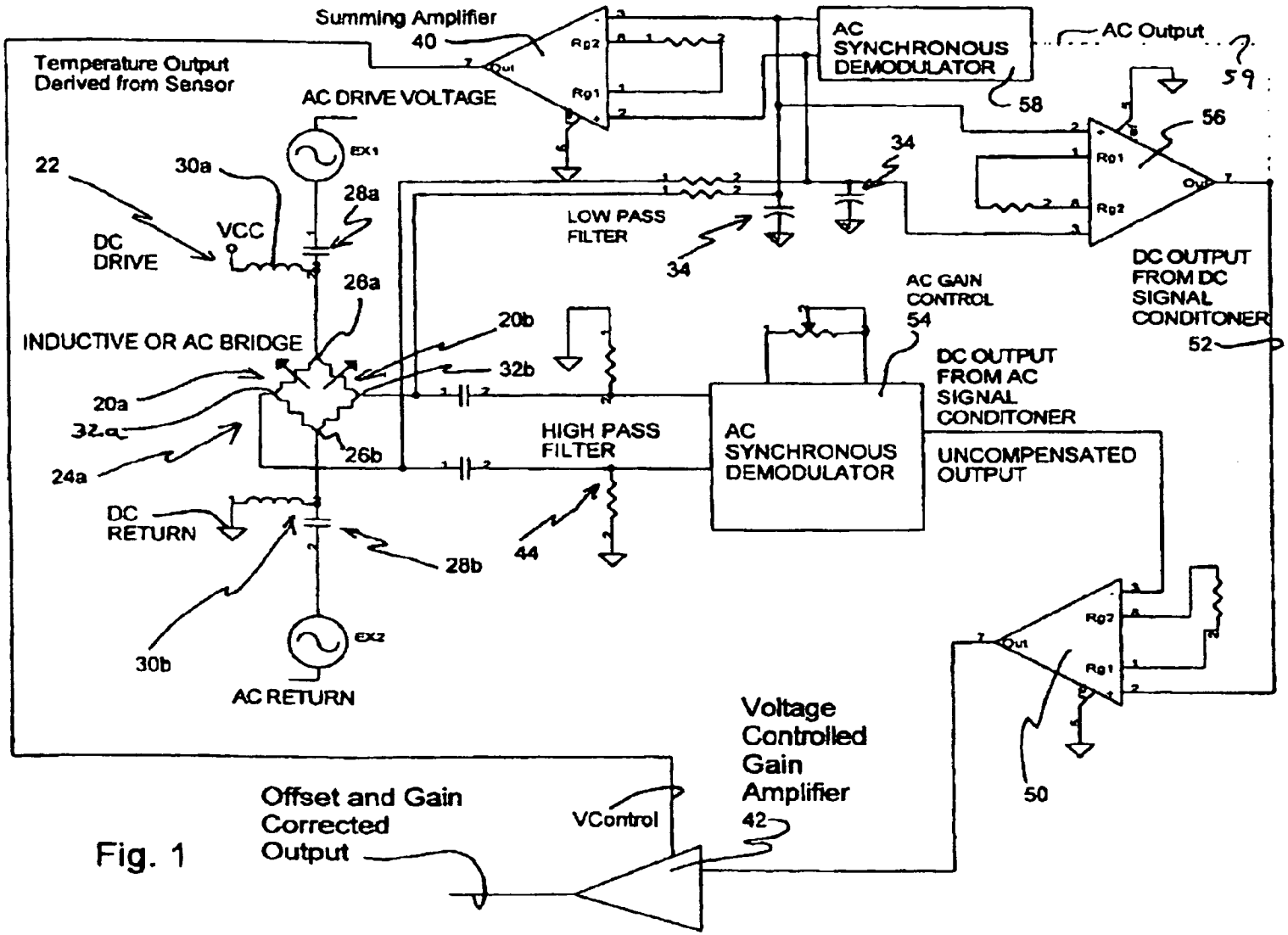
FIG. 1 is a block diagram of a circuit to correct a DVRT for time and spatial variations in temperature.

The present inventors recognized that a DVRT sensor that includes the circuit of '593 patent, incorporated herein by reference, provides substantial advantage in temperature compensation, but does not include all the temperature correcting needed. They recognized that a bridge circuit, such as that included in a DVRT, cancels the effects of uniform changes in temperature in the wiring of the coils of the DVRT, a substantial advantage for such differential sensors. They also recognized that the circuit of the '593 patent adequately corrects for the different coil wire resistances introduced by temperature gradients across the coils, an advantage in applications, such as automotive where such temperature gradients are common. The inventors then recognized an additional mechanism by which a change in temperature can cause errors: the magnetic permeability of the ferrite core varies with temperature. This change in permeability with temperature introduces a change in the inductance and reactance of the coils. They also recognized that uniform temperature change of the core is not canceled out by the bridge configuration of a DVRT and that no correction was provided by the gradient of the temperature correcting circuit of the '593 patent that corrected only for spacial variation in temperature.

The present invention provides a circuit that corrects for variation in permeability of the ferrite core as a result of a spatially uniform change in temperature. The present invention also integrates the new circuit with the circuit of the '593 application to compensate both for temperature changes in the ferrite core and for temperature gradients across the coils so as to provide very precise displacement sensing that is independent of both changes in temperature over time in the windings of the coils or in the ferrite core and for temperature gradients across the coils. In addition, the present invention enables using a single coil inductance transducer which until now has not been practical in part because of their higher sensitivity to temperature variation. The sensitivity to temperature variation is eliminated by this invention.

Inductive displacement sensors utilize a coil and a permeable core that can be moved relative to the coil. When the core is moved into the coil additional permeable material moves in, and this increases the inductance of the coil. A corresponding reduction in inductance occurs when the core moves out of the coil. In most systems a single core is used with two coils. The core leaves one coil as it enters more deeply into the other. The two coils are wired to provide a differential measurement, and this differential measurement lowers sensitivity to temperature change in the wiring since an increase or decrease in resistance in both two coils is cancelled by the differential measurement.

However the differential measurement is inadequate to correct for changes in permeability of the ferrite core except when an equal amount of the core is in both coils. In this unique case the error due to change in permeability of the core with temperature is zero. As soon as the core is displaced from the null position, however, so more is in one coil than the other, the differential measurement amplifies error, and the amount of error increases with the displacement from the null position.

In view of the temperature dependence of core permeability, accuracy of inductive sensors was limited to about 0.05% gain error/degree C. at the fully displaced core position. Thus, for a 100 degree temperature swing the error is 5%, which may be unacceptable large for some applications. A unique solution to reduce the error from temperature variation is provided by the present invention, and this solution can be applied in both single coil and dual coil transducers. By overcoming the error introduced by temperature variation the accuracy of the single coil sensor is substantially improved. However, dual coil transducers continue to have advantage since they also cancel out error from change in winding resistance with change in temperature.

Figure 2A:
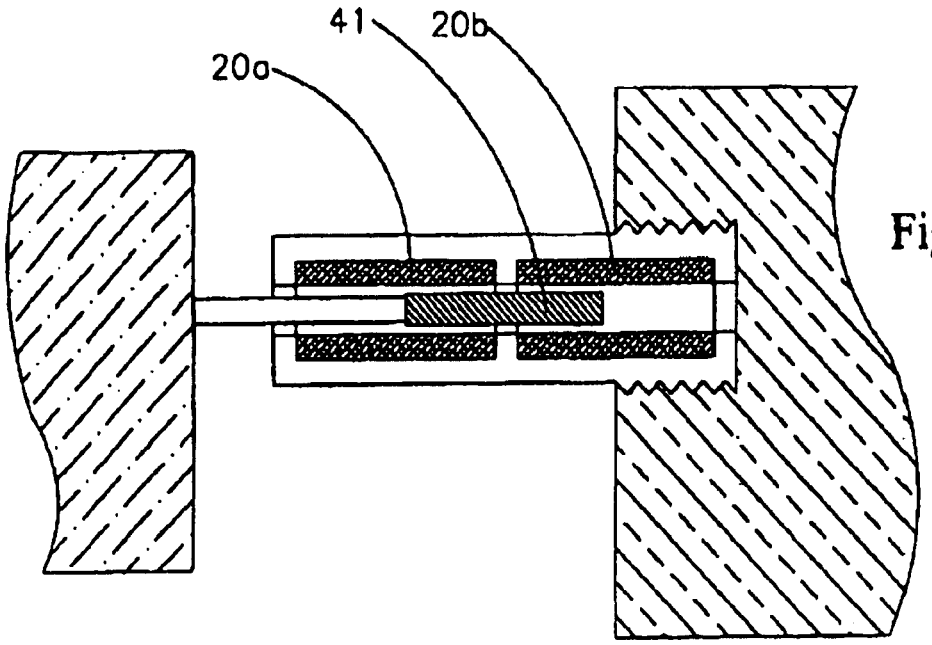
FIG. 2a is cross sectional view of a DVRT in the null position.
Figure 2B:
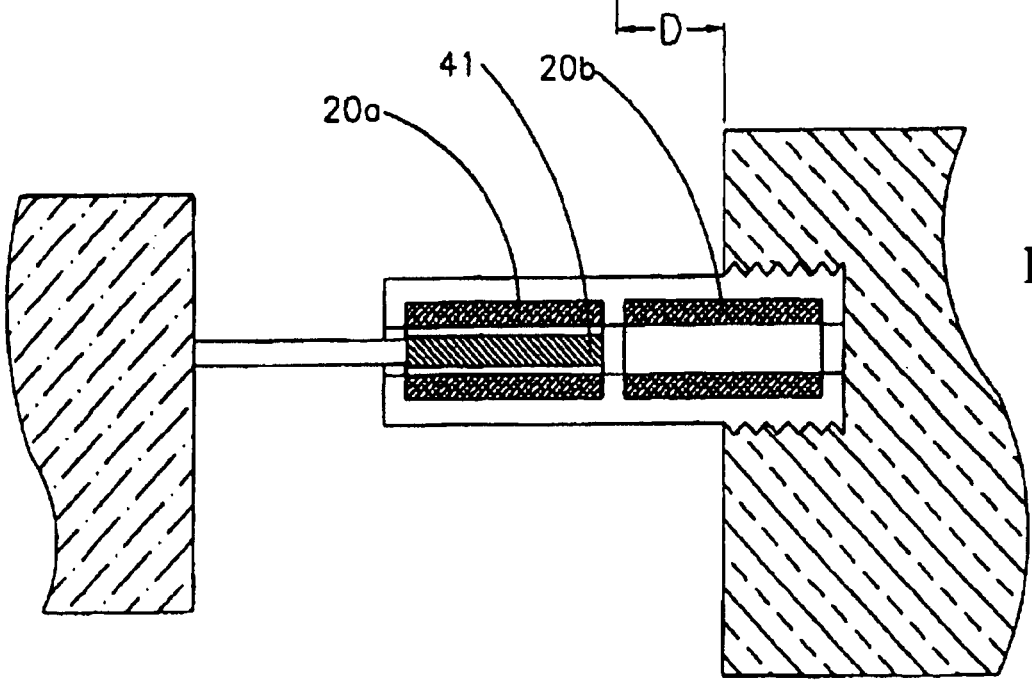
FIG. 2b is cross sectional view of the DVRT of FIG. 2a in the fully displaced position.

Differential pair of coils 20a, 20b for displacement sensor 22 are arranged in full Wheatstone bridge circuit 24a, as shown in FIG. 1 and FIGS. 2a, 2b. A single coil in a half Wheatstone bridge circuit can also be used. Both an AC sinusoidal voltage and a DC voltage are applied across bridge inputs 26a, 26b. Typically AC voltage is about 5 volts peak to peak at about 70 kHz and DC voltage is about 1 volt. Of course various other voltage amplitudes and frequencies can be used for each. For example, instead of a DC voltage a low frequency AC voltage can be used, such as 1 volt at 100 Hz. This would enable the use of an AC synchronous demodulator, as shown in FIG. 1, which improves signal to noise ratio in a high noise environment.

Capacitors 28a, 28b and inductors 30a, 30b are used to isolate AC and DC drive voltages from each other. Capacitors 28a, 28b can have a value of about 1 microfarad and inductors 30a, 30b a value of about 1000 microhenries. Various other values can be used depending on the two frequencies of the two applied voltages.

The DC resistance of each coil 20a, 20b of Wheatstone bridge 24a is proportional to temperature. This DC resistance of wiring in coils 20a, 20b is independent of the position of core 41 within coils 20a, 20b, varying only with temperature, so a change in DC voltage across the coils, which is proportional to their resistance, provides a measurement of a change in temperature. Coils 20a, 20b are fabricated of wire having a dimension of about 48 gauge and typically has a resistance of about 20 ohms for each coil.

Because the DC resistance of each coil is very low greater accuracy is obtained by summing DC voltages across both coils to provide an indication of the temperature of the coils. This DC voltage is obtained by passing output signals from output terminals 32a, 32b of coils 20a, 20b through low pass filter 34 and summing the voltage drops across each coil 20a, 20b individually in summing amplifier 40. Typically the voltage sum is about 100 mV at room temperature and this will vary as temperature changes.

Figure 3:
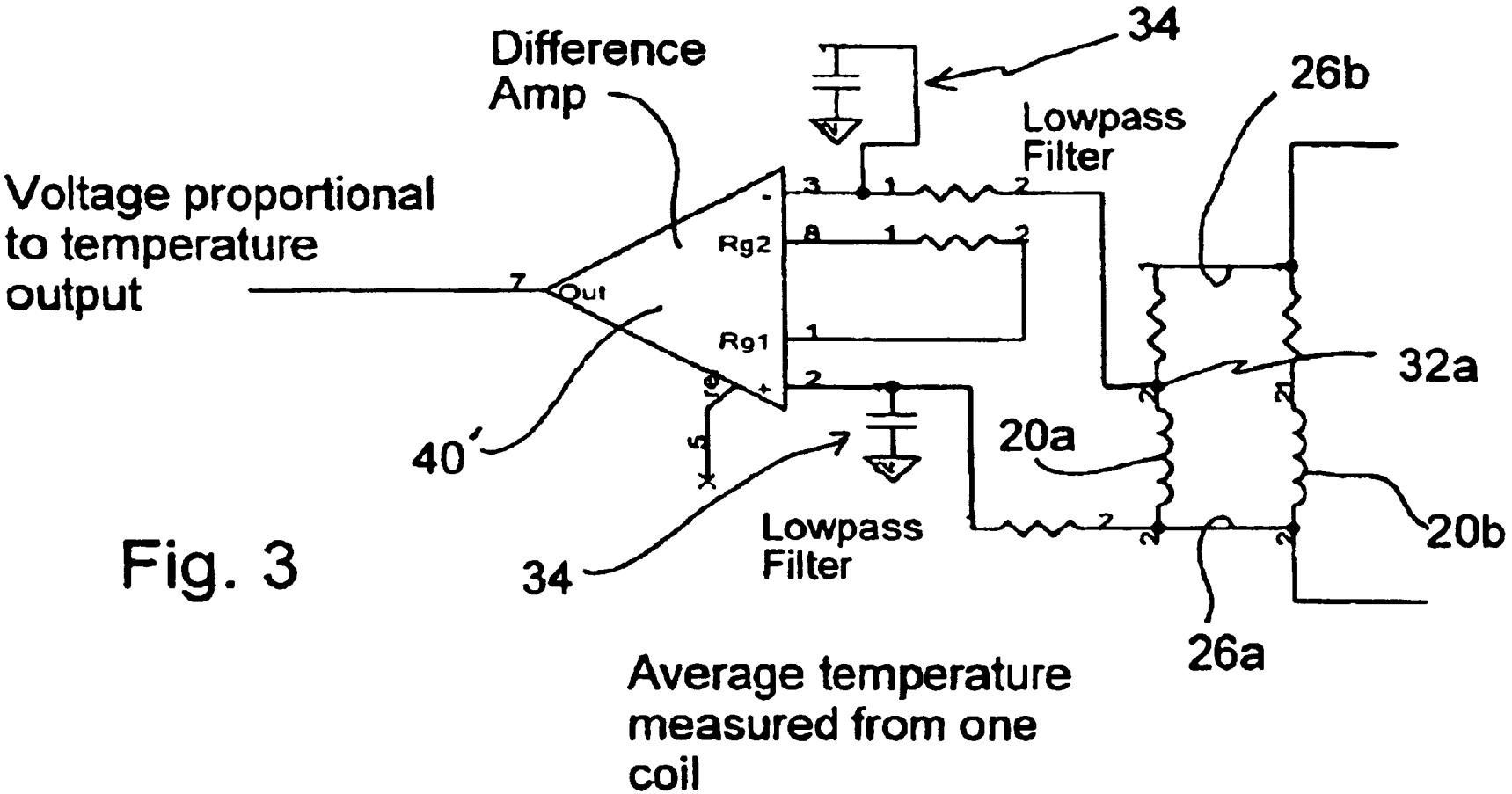
FIG. 3 is a block diagram showing measurement of resistance of one coil of a DVRT to correct a DVRT for time and spatial variations in temperature.
Figure 4A:
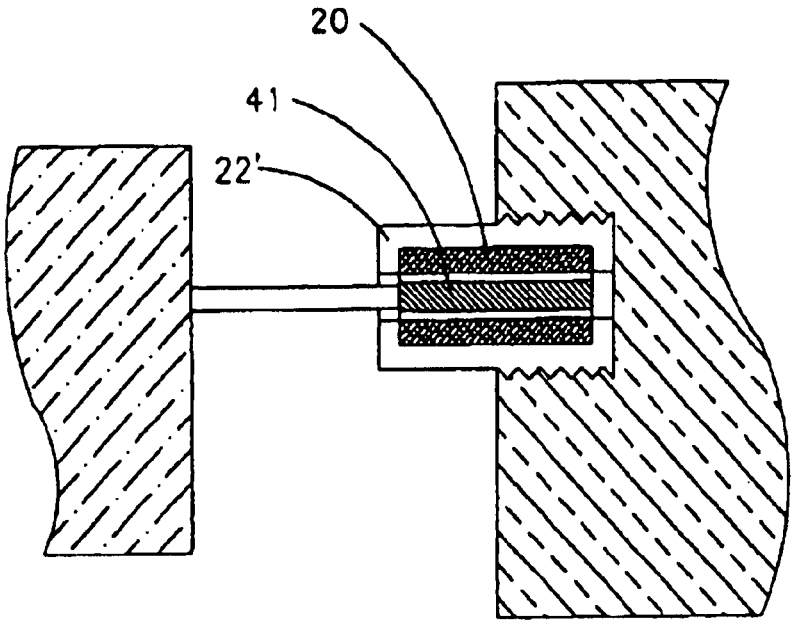
FIG. 4a is a cross sectional view of a single coil DVRT in the null position.
Figure 4B:
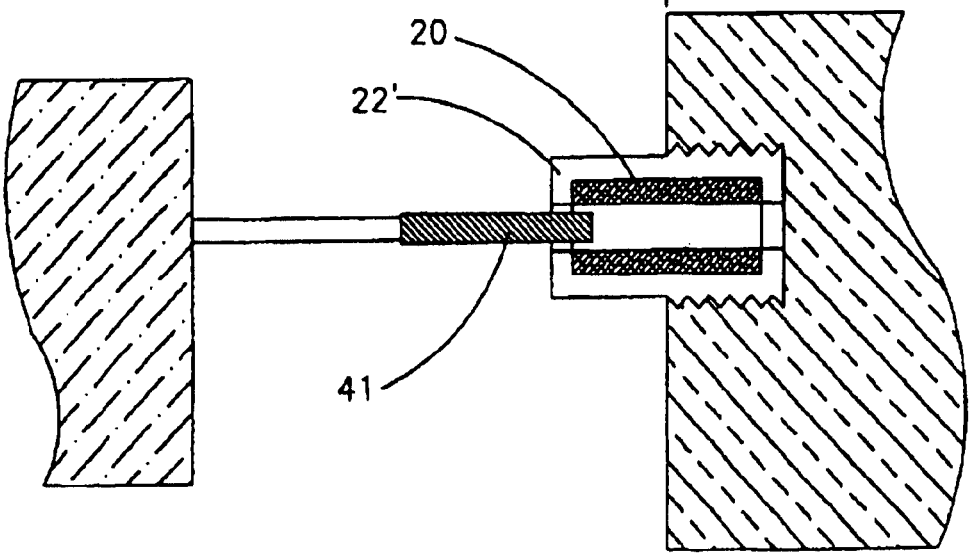
FIG. 4b is cross sectional view of the DVRT of FIG. 4a in the fully displaced position.

Voltage across single coil 20a of pair of coils 20a, 20b can also be used to provide a measure of temperature, as shown in FIG. 3. Difference amplifier 40' is used instead of summing amplifier 40 and the voltage provided to difference amplifier 40' is the voltage across one of the coils 20a or 20b. Sensor 22' having single coil 20 can also be used, as shown in FIGS. 4a, 4b, and correction for temperature variation equally provided. This measured temperature can be used to correct for variation in the wiring of the single coil and variation in the permeability of core 41. Advantage in having a single coil is that the sensor can be smaller since half the length is needed to measure the same displacement with a single coil.

Displacement is measured by measuring the change in AC voltage across the coil and adjusting this voltage to correct for the temperature. The AC voltage difference signal, or a signal conditioned to correct for a temperature gradient, is provided to voltage controlled variable gain amplifier (VGA) 42, as shown in FIG. 1. The sum of the DC voltages from summing amplifier 40 is fed to modulate the gain of VGA 42 to correct the AC difference signal from the coils for changes in temperature. The gain of VGA 42 is modulated by the DC voltage signal in the opposite direction of the gain error caused by the temperature sensitive permeability of the core, providing a corrected output voltage that is now more nearly independent of temperature. This temperature output voltage is now used to determine the displacement value. Wiring of the device itself is used to correct readings for changes in temperature in another part of the device, the core. Alternatively, a programmable device, such as a microprocessor, can be used instead of a VGA to apply the compensation by using appropriate scale factors for temperature stored in a memory associated with the microprocessor. The microprocessor can also be used to provide the excitation signals.

The present invention is easily combined with the technique described in the '593 patent, and the combination is shown in FIG. 1, providing a complete temperature compensation method for both time and spacial temperature variation. Several components are used by both elements, so only VGA 42 need be added to the circuit of the '593 patent. Voltage controlled amplifier 42 is connected to receive gradient compensated output from difference amplifier 50 and temperature information from summing amplifier 40, and its output provides the additional correction for temperature change in ferrite core 41.

As more fully described in the '593 patent, incorporated herein by reference, temperature gradient correcting circuit 52 provides a DC voltage level corresponding to amplitude of displacement of core 41 corrected for spatial variation in temperature across coils 20a, 20b. The AC signal between output terminals 32a, 32b of coils 20a, 20b is first analyzed by stripping off DC and low frequency signal at high pass filter 44. The AC signal is now converted to a DC level in AC synchronous demodulator 54. The DC level gives an uncompensated indication of the magnitude of displacement of core 41 in coils 32a, 32b. A first compensation step is now provided to the signal from demodulator 54 with gradient of temperature information from DC signal conditioner 56 in difference amplifier 50. DC signal conditioner 56 provides an output that is proportional to the difference in temperature between the two coils to give the temperature gradient information. The output of difference amplifier 50 is a signal proportional to the displacement of core 41 corrected for gradient of temperature across coils 20a, 20b. The output of VGA 42 is a signal proportional to the displacement of core 41 corrected for both gradient of temperature across coils 20a, 20b and for a change of temperature with time across both coils 20a, 20b and core 41.

In one alternative, a low frequency signal can be used instead of a DC signal. In this case AC synchronous demodulator 58 would be used in place of signal conditioner 56, and similarly connected as shown by dotted line 59 of FIG. 1.

To summarize, summing amplifier 40 receives low frequency inputs from both coils after the signal passes through low pass filter 34. Summing the low frequency outputs gives a voltage that tracks with temperature. AC synchronous demodulator 56 takes the difference in voltages across the coils on the two sides of the bridge and converts to a DC voltage to be used for compensating for the gradient in temperature. The DC difference voltage represents the temperature gradient across the two coils arranged in a bridge configuration. No correction is needed for a uniform temperature change with time same the bridge circuit automatically cancels that out. Some temperature differences do not equally effect both sides of the bridge, such as a change in permeability of the core 41 with temperature. In this case, there will be no cancellation, and output of the sensor will vary with temperature. This variation can be corrected by determining the temperature by measuring resistance of the windings with a DC or low frequency signal and using that result to correct the high frequency signal. The low frequency signal can also be used to correct for gradient of temperature.

The use of a voltage controlled gain amplifier modulated with a voltage containing temperature information can be used in any system using a coil to measure a physical parameter. These coils may be wound on a bobbin or coil form, may be free standing, or can be etched or patterned onto a substrate. The substrate can be a circuit board, and can also include signal conditioning electronics. These coils may be used for other purposes than displacement measurement, such as to detect the position or presence of conductive and ferrous targets. The coil and the target may be used in non-contacting position sensors and in plunger type position sensors, where the relative position of the coil and the target are measured. These types of devices include displacement sensors, but can be combined with the appropriate flexure element to construct force, acceleration, pressure, and torque sensors. Targets may also be a gear tooth or may be patterned onto a substrate such that the output of the sensing coil produces a waveform which can be used to measure linear or angular position. Furthermore, the target material may exhibit magnetoelastic characteristics, such as permalloy ribbons and maraging steels and these magnetoelastic targets may be combined with sensing coils to produce non-contact strain, stress, and torque sensors.

The circuit of the present invention is a physical embodiment of a linear equation linking displacement of core 41 and voltage across coils:

$$D=M(T)V_{AC}(\omega L_1-\omega L_2)G(T)+C \quad (1)$$

where D is the displacement of core 41. At any particular temperature, M(T) is a constant indicating the slope of the linear relationship between displacement and measured AC voltage V. M(T) depends on the permeability of core 41, on the magnitude of $V_{AC}$ and the voltage gain of amplifiers in AC synchronous demodulator 54. Since the permeability of core 41 depends on temperature M(T) will be a function of temperature too. More specifically, equation (1) links displacement D of core 41 to voltage V across coils 20a, 20b at output pads 32a, 32b. ω is the frequency of the AC signal applied across pads 26a, 2b. $L_1$ is the inductance of coil 20a and $L_2$ is the inductance of coil 20b including the effect of core 41 within each coil. G(T) is a function that has an inverse relationship to temperature to that of M(T) to compensate for the change in permeability of core 41 with temperature so that product of M(T) and G(T) is constant at all temperatures. C is the y intercept of the linear relationship and is a constant that depends on the definition of the initial position of core 41core 41. Voltage $V(\omega L_1-\omega L_2)$ is determined from voltages proportional to resistance and reactance in coils 32a, 32b of sensor 22. For each coil, $$Z=\omega L+R \tag{2}$$

where Z is the impedance of that coil including both impedance from coil resistance and impedance from coil inductance. The voltage associated with the impedance Z is what is measured at pads 32a, 32b. Coil inductance L includes the effect of turning the wire in a coil and the effect of core 41 within that wiring. Thus, L for each coil is a function of displacement of core 41. L is the total inductance of that coil with core 41 as it is located within the coil for a particular displacement of core 41. R is the resistance of the wiring making up that particular coil. R varies with temperature of the wiring and may be determined from the DC signal applied to pads 26a, 26b as described herein above. However, in the circuit of the invention the voltage associated with this resistance is actually determined and subtracted to obtain the voltage from the inductive reactance alone. Thus, for the first coil:

$$V_{AC}(\omega L_1)=V_{AC}(Z_1)-V_{DC}(R_1) \tag{3}$$

where $V_{AC}(\omega L_1)$ is the voltage associated with the inductive reactance of coil 1. $V_{AC}(Z_1)$ is the voltage associated with the measured impedance of coil 1 and $V_{DC}(R_1)$ is the voltage associated with the resistance of wiring within coil 1. A similar equation applies to coil 2.

difference amplifier 50 subtracts the sum of voltages associated with wire resistance of both coils from the voltage associated with the overall impedance of the coils to obtain the voltage associated with just the inductive reactance of the coils. This voltage is now corrected according to G(T) for temperature change in core 41 based on the same resistance used in equations (2) and (3).

Figure 5:
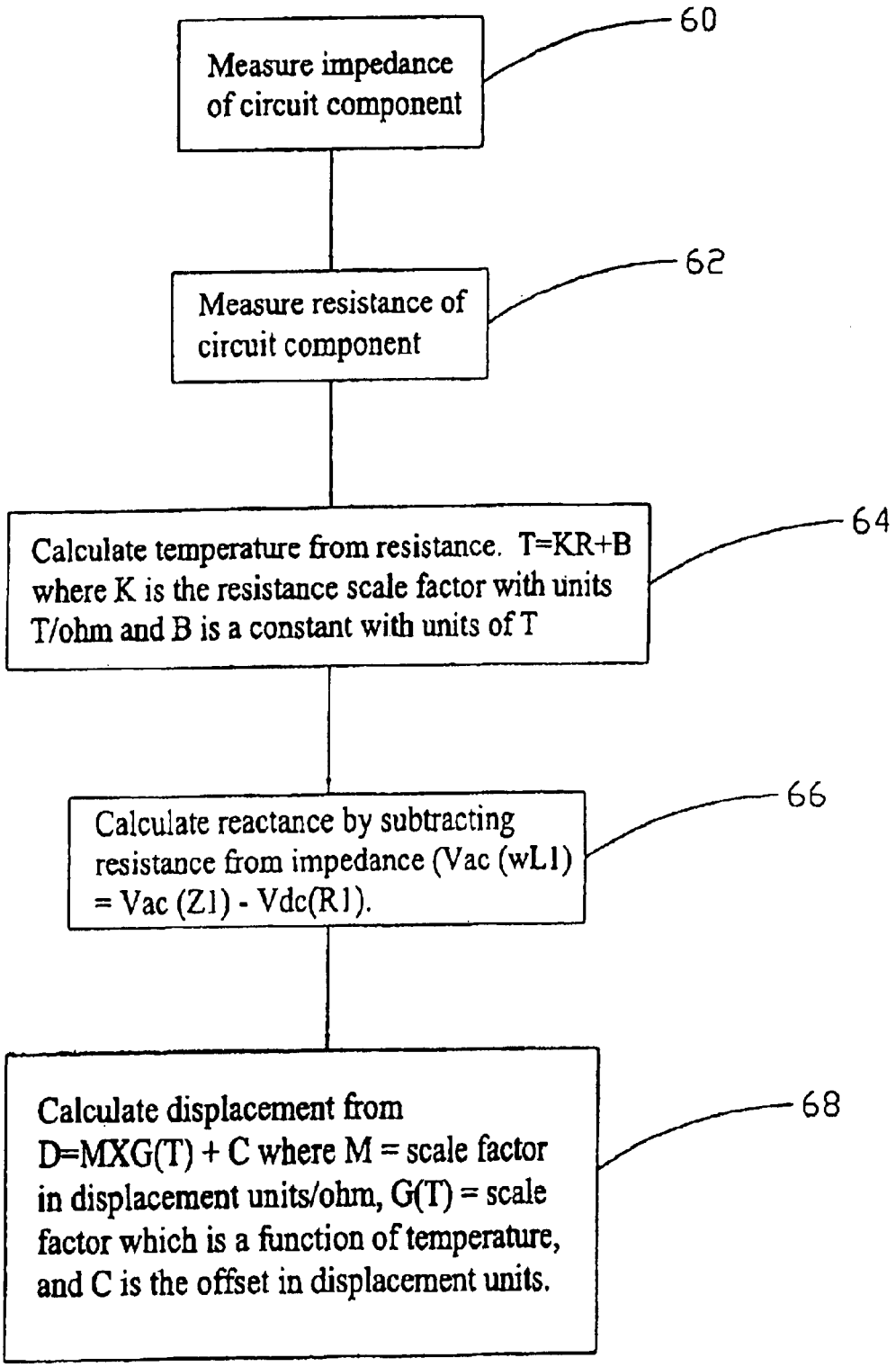
FIG. 5 is a flow chart showing the algorithm of FIG. 1 to compensate for change in temperature in the permeable member.

The invention follows the steps shown in the flow chart in FIG. 5. AC voltage difference measured across pads 32a, 32b provides a measure of impedance $(Z_1-Z_2)$ of coils 20a, 20b, as shown in step 60. DC voltage across coil 20a plus DC voltage across coil 20b provides a measure of the sum of the resistances of coils 20a, 20b, as shown in step 62. Temperature can be calculated from the resistances as shown in step 64 using the equation $$T=KR+B \tag{4}$$

The voltage associated with the resistance is actually used by difference amplifier 50 to calculate the voltage difference associated just with the difference in inductive reactance of the two coils, as shown in step 66. Temperature correction of voltage is now provided for change in temperature of core 41. Displacement is now calculated as shown in step 68.

Figure 6:
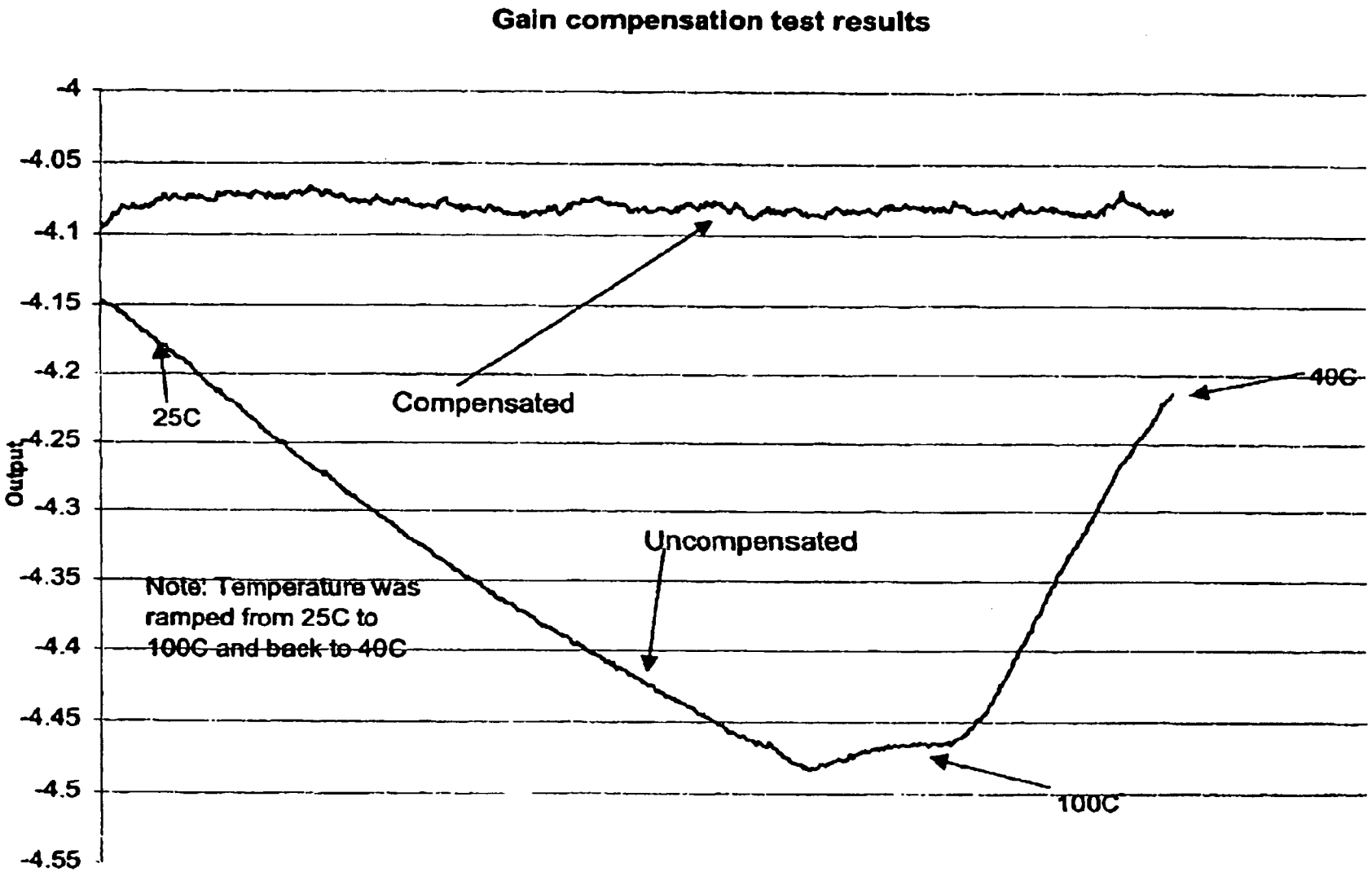
FIG. 6 is a graph of test data comparing a device of the present invention to a device without the circuit element for compensating for temperature changes in the highly permeable member.

Test results for a device of the present invention are shown in FIG. 6 in comparison with a standard uncompensated DVRT. Both devices have the gradient of temperature compensation provided by the '593 patent. The bottom trace shows substantial variation in output voltage as temperature changes from 25 C. to 100 C. and then back to 40 C. The top trace shows no change in output voltage over these same temperature changes.

While several embodiments of the invention, together with modifications thereof, have been described in detail herein and illustrated in the accompanying drawings, it will be evident that various further modifications are possible without departing from the scope of the invention. Temperature corrections for the output of a DVRT have been described but the same concept of separating resistive from reactive components of an output signal and using the resistive part to provide temperature correction for the reactive part can be used for other types of sensors, devices, and circuits as well. Nothing in the above specification is intended to limit the invention more narrowly than the appended claims. The examples given are intended only to be illustrative rather than exclusive.

What is claimed is:

1. An electronic device, comprising a sensor sensitive to position of *at least one from the group consisting of* a conductive [or] *material and a* ferrous material, said sensor comprising a single coil inductance transducer, a temperature measurement circuit for providing a temperature output derived from said sensor, a position measuring circuit for measuring position of said [conductive or ferrous] material, and a voltage controlled gain adjusting device, wherein said temperature measurement circuit provides a voltage proportional to temperature to said voltage controlled gain adjusting device to adjust output voltage of said position measuring circuit to provide temperature compensated sensor data, wherein said temperature measurement circuit uses a signal derived from resistance of said single coil inductance transducer to provide said voltage proportional to temperature.

2. The electronic device as recited in claim 1, wherein said [conductive or ferrous] material comprises a magnetically permeable member, wherein said magnetically permeable member is moveable.

3. The electronic device as recited in claim 2, wherein said moveable magnetically permeable member is located within said single coil inductance transducer.

4. The electronic device as recited in claim 3, wherein said magnetically permeable member has a member length and said single coil has a coil length, wherein said member length is about equal to said coil length.

5. The electronic device as recited in claim 1, wherein said sensor is a displacement sensor.

6. The electronic device as recited in claim 1, wherein said sensor comprises input pads for receiving a first signal and a second signal, said first signal having a higher frequency than said second signal.

7. The electronic device as recited in claim 1, wherein said voltage controlled gain adjusting device comprises a variable gain amplifier[or a microprocessor].

8. The electronic device as recited in claim [1] *2*, wherein said magnetically permeable member comprises a highly permeable material.

9. The electronic device as recited in claim 8, wherein said highly permeable material comprises permalloy[, ferrite, and 400 series stainless steel].

10. The electronic device as recited in claim 1, wherein said magnetically permeable member comprises magnetoelastic characteristics.

11. The electronic device as recited in claim 10, wherein said magnetoelastic characteristics are modulated by *at least one from the group consisting of* strain, stress, [or] *and* torque.

12. The electronic device as recited in claim 1, wherein said sensor is to detect [the] *at least one from the group consisting of* position [or] *and* presence of *at least one from the group consisting of* a conductive [or] *target and a* ferrous target.

13. The electronic device as recited in claim 12, wherein said single coil and said target are non-contacting and wherein [relative] *said* position *measuring circuit measures relative position* of said single coil and said target[are measured].

14. The electronic device as recited in claim 12, wherein said [target] *material* has magnetoelastic characteristics.

15. The electronic device as recited in claim 1, wherein said sensor [comprises] *includes at least one from the group consisting of* a displacement sensor, a force sensor, an acceleration sensor, a pressure sensor, [or] *and* a torque sensor.

16. The electronic device as recited in claim 1, wherein said sensor further comprises a flexure element.

17. An electronic device, comprising a single coil inductance transducer having a single coil and a magnetically permeable member that extends in said single coil, said device further comprising a temperature measurement circuit, a position measuring circuit, and a voltage controlled gain adjusting device, wherein said temperature measurement circuit provides a voltage proportional to temperature to said voltage controlled gain adjusting device to adjust output voltage of said position measuring circuit to compensate for a change in temperature in said single coil and in said member.

18. The electronic device as recited in claim 17, wherein said magnetically permeable member is movable with respect to said single coil.

19. The electronic device as recited in claim 17, wherein said circuit uses resistance of said single coil to compensate for change in temperature of said single coil and in said member.

20. The electronic device as recited in claim 17, wherein said single coil inductance transducer comprises a displacement sensor.

21. The electronic device as recited in claim 17, wherein said transducer comprises input pads for receiving a first signal and a second signal, said first signal having a higher frequency than said second signal.

22. The electronic device as recited in claim 17, wherein said voltage controlled gain adjusting device comprises a variable gain amplifier[or a microprocessor].

23. The electronic device as recited in claim 17, wherein said magnetically permeable member comprises a highly permeable material.

24. The electronic device as recited in claim 23, wherein said highly permeable material comprises permalloy[, ferrite, and 400 series stainless steel].

25. The electronic device as recited in claim 17, wherein said magnetically permeable member comprises magnetoelastic characteristics.

26. The electronic device as recited in claim 25, wherein said magnetoelastic characteristics are modulated by [stain] *at least one from the group consisting of strain*, stress, [or] *and* torque.

27. The electronic device as recited in claim 17, wherein said magnetically permeable member has a member length and said single coil has a *single* coil length, wherein said member length is about equal to said *single* coil length.

28. An electronic [deuce] *device*, comprising a single inductor, a [conductive or magnetically permeable] member [coupled to said single inductor,] a temperature measurement circuit, an inductance measuring circuit, and a voltage controlled gain adjusting device, *wherein said member includes at least one from the group consisting of a conductive material and a magnetically permeable material, wherein said member is coupled to said single inductor,* wherein said temperature measurement circuit provides a voltage proportional to temperature to said voltage controlled gain adjusting device to adjust output voltage of said inductance measuring circuit to provide an adjusted output voltage independent of temperature of said single inductor and *independent of* temperature of said [conductive or magnetically permeable] member.

29. The electronic device as recited in claim 28, wherein said [magnetically permeable] member is moveable with respect to said inductor.

30. The electronic device as recited in claim 28, wherein said circuit uses resistance of said single inductor to compensate for change in temperature of said single inductor and in said member.

31. The electronic device as recited in claim 28, wherein said single inductor, *said* member, and *said* circuit comprise a sensor.

32. The electronic device as recited in claim 31, wherein said single inductor, *said* member, and *said* circuit comprise a displacement sensor.

33. The electronic device as recited in claim 32, wherein said sensor comprises input pads for receiving a first signal and a second signal, said first signal having a higher frequency than said second signal.

34. The electronic device as recited in claim 28, wherein said voltage controlled gain adjusting device comprises a variable gain amplifier[or a microprocessor].

35. The electronic device as recited in claim 28, wherein said [magnetically permeable] member comprises a highly *magnetically* permeable material.

36. The electronic device as recited in claim 35, wherein said highly *magnetically* permeable material comprises permalloy[, ferrite, and 400 series stainless steel].

37. The electronic device as recited in claim 28, wherein said [magnetically permeable] member comprises magnetoelastic characteristics.

38. The electronic device as recited in claim 37, wherein said magnetoelastic characteristics are modulated by *at least one from the group consisting of* strain, stress, [or] *and* torque.

39. The electronic device as recited in claim 28, wherein said [magnetically permeable] member has a member length and said single inductor has [an] *a single* inductor length, wherein said member length is about equal to said *single* inductor length.

40. [A] *An electronic* device comprising a single component, a temperature measurement circuit, a first parameter measuring circuit for measuring a value of said single component, and a voltage controlled gain adjusting device, wherein said temperature measurement circuit provides a voltage proportional to temperature to said voltage controlled gain adjusting device to adjust output voltage of said first parameter measuring circuit to make adjusted output voltage of said first parameter measuring circuit independent of change in temperature with time.

41. [A circuit] *The electronic device* as recited in claim 40, wherein said single component comprises a single inductor.

42. [A circuit] *The electronic device* as recited in claim 41, wherein said single inductor has a magnetically permeable core.

43. The electronic device as recited in claim 42, wherein said magnetically permeable core has a core length and said single inductor has a single inductor length, wherein said core length is about equal to said inductor length.

44. The electronic device as recited in claim 40, wherein said voltage controlled gain adjusting device comprises a variable gain amplifier or a microprocessor.

45. The electronic device as recited in claim 40, further comprising a lower frequency power supply and a higher frequency power supply connected to provide a lower frequency and a higher frequency signal to said single component.

46. The electronic device as recited in claim 45, wherein said lower frequency power supply provides direct current.

47. The electronic device as recited in claim 40, further comprising a low pass filter and a high pass filter, each connected to receive an output of said single component.

48. The electronic device as recited in claim 40, further comprising a demodulator positioned after said high pass filter.

49. The electronic device as recited in claim 40, further comprising a difference amplifier connected to receive said low frequency signal output from said coil, wherein said difference amplifier provides a voltage proportional to a temperature of said coil.

50. The electronic device as recited in claim 49, wherein said difference amplifier comprises an instrumentation amplifier.

51. The electronic device as recited in claim 40, further comprising a span adjustment circuit.

52. The electronic device as recited in claim 51, wherein said span adjustment circuit comprises a variable gain amplifier.

53. The electronic device as recited in claim 51, wherein said span adjustment circuit comprises a microprocessor.

*54. The electronic device as recited in claim 28, wherein said member comprises a magnetoelastic material.*

*55. The electronic device as recited in claim 28, wherein said member comprises a target.*

*56. The electronic device as recited in claim 55, wherein said single inductor and said target are parts of a non-contacting position sensor.*

*57. The electronic device as recited in claim 55, wherein said target exhibits magnetoelastic characteristics.*

*58. The electronic device as recited in claim 57, wherein said single inductor and said target are parts of at least one from the group consisting of a non-contacting strain sensor, a non-contacting stress sensor, and a non-contacting torque sensor.*

*59. The electronic device as recited in claim 41, further comprising a conductive material, wherein said single inductor is coupled to said conductive material.*

*60. The electronic device as recited in claim 41, further comprising a magnetoelastic material, wherein said single inductor is coupled to said magnetoelastic material.*

*61. The electronic device as recited in claim 41, further comprising a target.*

*62. The electronic device as recited in claim 61, wherein said single inductor and said target are parts of a non-contacting position sensor.*

*63. The electronic device as recited in claim 61, wherein said target includes a material that exhibits magnetoelastic characteristics.*

*64. The electronic device as recited in claim 63, wherein said single inductor and said target are parts of at least one from the group consisting of a non-contacting strain sensor, a non-contacting stress sensor, and a non-contacting torque sensor.*

*65. The electronic device as recited in claim 1, wherein said voltage controlled gain adjusting device comprises a microprocessor.*

*66. The electronic device as recited in claim 8, wherein said highly permeable material comprises ferrite.*

*67. The electronic device as recited in claim 8, wherein said highly permeable material comprises 400 series stainless steel.*

*68. The electronic device as recited in claim 17, wherein said voltage controlled gain adjusting device comprises a microprocessor.*

*69. The electronic device as recited in claim 23, wherein said highly permeable material comprises ferrite.*

*70. The electronic device as recited in claim 23, wherein said highly permeable material comprises 400 series stainless steel.*

*71. The electronic device as recited in claim 28, wherein said voltage controlled gain adjusting device comprises a microprocessor.*

*72. The electronic device as recited in claim 35, wherein said highly permeable material comprises ferrite.*

*73. The electronic device as recited in claim 35, wherein said highly permeable material comprises 400 series stainless steel.*

* * * * *